Patented Oct. 27, 1931

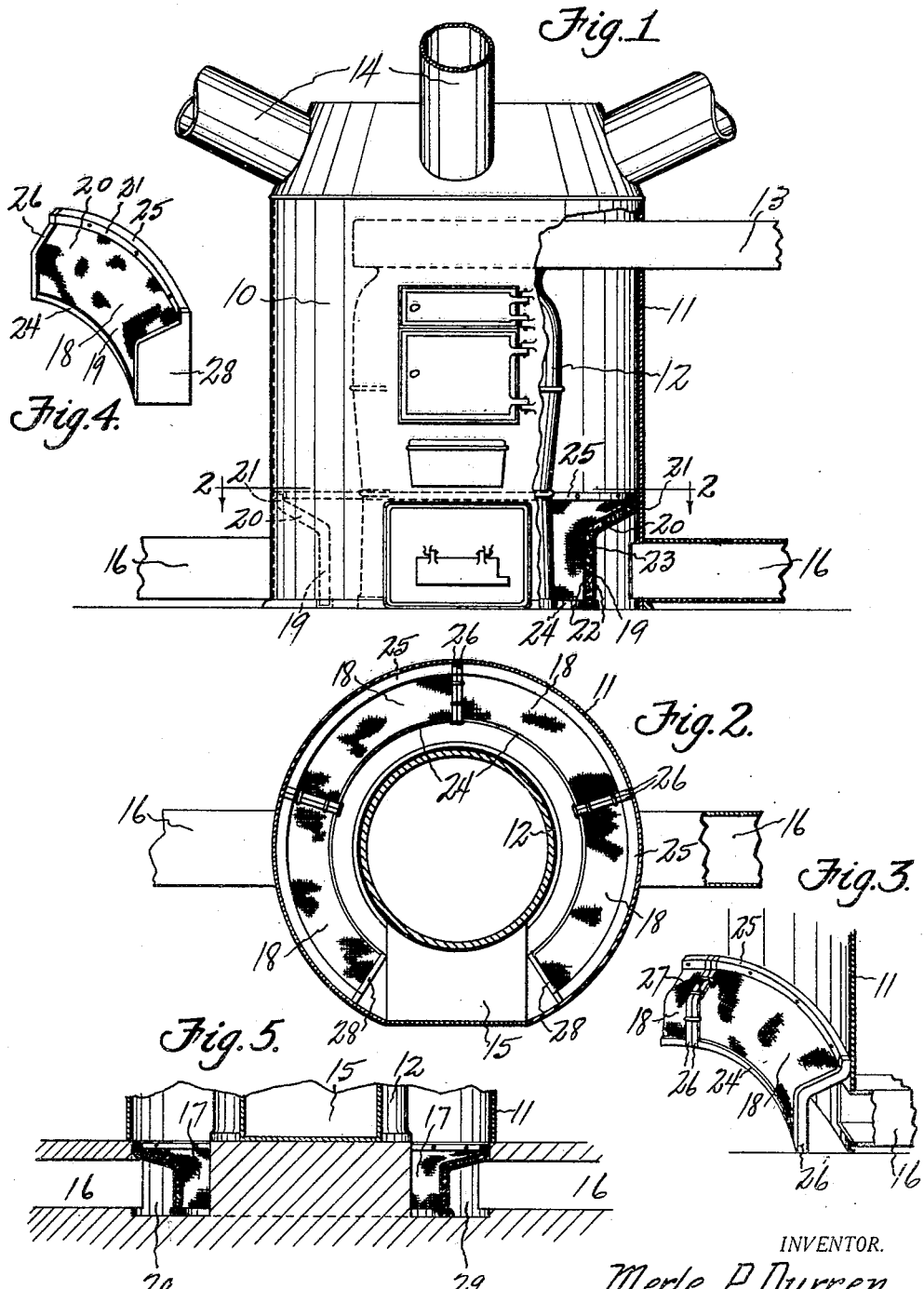

1,829,344

UNITED STATES PATENT OFFICE

MERLE P. DURREN, OF DOWAGIAC, MICHIGAN

AIR FILTER

Application filed September 19, 1930. Serial No. 482,973.

The invention relates to air filters, and particularly to air filters for use in hot air furnaces, and has for its object to provide a device of this character adapted to be positioned within the casing of the furnace whereby all of the air passing through said furnace will be filtered without retarding the circulation of air through the furnace.

A further object is to provide a device of this character formed of filtering material whose area is large in proportion to the cross sectional area of the air intakes of the furnace.

A further object is to provide a device of this character formed of a plurality of sections adapted to be easily inserted in the furnace casing and adapted to be secured together in the casing in contacting relation to form a filtering unit.

A further object is to provide a device of this character of a shape conforming to the inner periphery of the furnace casing adapted to be mounted upon the floor of the furnace in spaced relation to the casing and extending into engagement with the inner periphery of the casing above the furnace air ducts whereby said device provides a passageway about the inner periphery of the furnace communicating with said air ducts.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a view in front elevation and partly in section of a furnace provided with my filtering device.

Figure 2 is a transverse horizontal sectional view taken on line 2—2 of Figure 1.

Figure 3 is a fragmentary perspective view of the filtering device mounted in a furnace in operative position.

Figure 4 is a perspective view of an end section of the filtering device.

Figure 5 is a fragmentary vertical sectional view of a furnace having sub-surface air ducts and provided with the filtering device.

Referring to the drawings, which illustrates the preferred embodiment of the invention, the numeral 10 designates a conventional hot air furnace having a casing 11, a fire box 12, a smoke flue 13, heating pipes 14, ash chamber 15, and air ducts 16. My filtering device 17 is adapted to be mounted in the casing 12 of the furnace at the lower end thereof and adjacent the air ducts 16, so that the air entering the furnace casing through said ducts must pass through said filtering device in entering said casing. The filtering device is formed in a plurality of sections 18 of a shape conforming to the inner periphery of the casing and preferably of the same size and shape, which are adapted to be secured together in end-contacting relation to form a filtering unit. As best illustrated in transverse section in Figure 1, each section 18 is formed of a vertically extending portion 19 mounted on the floor of the furnace in spaced relation to the inner periphery of the casing, and an angularly outwardly extending portion 20 integrally formed with portion 19 and terminating in a short upwardly extending portion 21 engaging the inner periphery of the casing above the point at which the air ducts enter the casing.

The filtering device is preferably formed of spaced inner and outer wire screens 22 having interposed between them a suitable filtering element 23, such as steel wool, although it is to be understood that any other filtering element may be used. The upper and lower edges of each section of the device are bound by channel-sectioned members 24 and 25, respectively, which are preferably formed of sheet metal and which serve to hold the screens 22 and the filtering element 23 in their correct position in the device. The ends of each section are also bound by end members 26 of channel-section and of a shape conforming to the sectional shape of the filtering member, as described. Each section 18 thus has its peripheral edges suitably bound by members 24, 25 and 26, which members also reinforce the sections and hold them in their proper shape.

The sections 18 are disposed in end-contacting relation in the casing 11 to extend therearound within the inner periphery thereof, and said sections are secured together in proper relation by any suitable means such as wires 27 wound around the contacting end members 26 of adjacent sections 18 of the device, and said sections thus form a continuous device of the same shape and section throughout. The ends of the filtering device when assembled preferably extend to the opposite sides of the ash chamber 15, and these ends are provided with suitable caps 28, illustrated in Figure 4, which comprise a plate carried by the end of the filtering member and extending perpendicularly therefrom to the floor and casing of the furnace.

It will thus be seen that the filtering element is disposed in the furnace casing to form a passage-way formed of filtering material and conforming to the shape of the casing which extends about the inner periphery of the casing at its lower end and communicates with the air ducts of the furnace. The passage-way so formed has its ends closed by the plates 28 whereby all of the air entering the furnace casing must pass through the filtering element, although it may travel through said passage-way and thence pass through the filtering device at a point remote from the air duct in entering the furnace casing proper. The filtering element, being of an area many times larger than the cross sectional area of the air ducts communicating with the casing, does not retard the circulation of air in the heating system as do filters of an area only equal to the cross sectional area of the air duct. Therefore when used in connection with gravity-operated air circulating systems the filter does not retard the circulation of the system, and when used in connection with a forced air circulation system the air is properly filtered and is not forced through the filter under a high pressure which destroys the filtering action of a filter. It is also obvious that this device as constructed in sections may be installed in a furnace during its erection, or may be installed in a previously erected furnace, with substantially equal facility.

The device as illustrated in Figures 1 to 4 is shown as applied to a furnace of the type in which the cold air ducts are positioned above the surface of the floor; and in Figure 5 the device is illustrated in connection with the type of furnace employing sub-surface air ducts communicating with the furnace casing. In this latter type of furnace a pit 29 in the floor communicates with the air ducts, and the furnace casing is mounted about said pit. With such furnaces the filtering device is mounted in the pit to form the filtering passage-way therein in the same manner as hereinbefore described.

It is contemplated that various changes may be made in the specific shape and assembly of the device, and in the specific materials employed. Thus the end plates 28 may be replaced by filtering members of the same shape and position to permit air to pass out of the ends of the passage and to be filtered in so doing. Another modification of the filtering device may consist in making the device of a form substantially linear in cross section to extend angularly from the floor to the casing rather than vertically from the floor and thence angularly to the casing.

The invention having been set forth, what is claimed as new and useful is:

1. The combination with a hot air furnace having a casing, an air duct communicating with said casing, of an air filter mounted in said casing, said air filter cooperating with said casing to form a closed passage-way in said casing communicating with said air duct whereby the air from said duct passes through said passage-way and filter in entering said casing.

2. The combination with a hot air furnace having a casing, an air duct communicating with said casing, of an air filter mounted in said casing, said air filter cooperating with said casing to form a passage-way in said casing communicating with said air duct, means closing the ends of said passage-way whereby the air from said duct passes through said filter from said passage-way in entering said casing.

3. The combination with a hot air furnace having a floor, a casing, an air duct communicating with said casing, of an air filter mounted in said casing, said filter being mounted on the furnace floor in spaced relation to the casing and extending into engagement with the casing above the air duct to form a passage-way communicating with the air duct, the air from said duct passing through said passage-way and filter in entering the casing.

4. The combination with a hot air furnace having a casing, an air duct communicating with said casing, of an air filter of a shape conforming to the inner periphery of the casing mounted in the casing, said filter comprising a plurality of connected sections cooperating with the casing to form a passage-way communicating with said air duct, and means closing the ends of said passage-way whereby the air from said duct passes through said passage-way and filter in entering said casing.

5. The combination with a hot air furnace having a casing, an air duct communicating with said casing, of an air filter mounted in said casing, said air filter cooperating with said casing to form a closed passage-way in said casing communicating with said air duct, and reinforcing means carried by said filter and supporting it in passage-forming position.

6. The combination with a hot air furnace having a floor, a casing, an air duct communicating with said casing, of an air filter mounted in said casing to form a passageway communicating with said duct, said air filter comprising a lower upwardly extending portion mounted on the floor in spaced relation to the casing and terminating in an upper outwardly extending portion engaging said casing above said air duct, the air from said air duct passing through said passageway and filter in entering said casing.

7. The combination with a hot air furnace having a floor, a casing, an air duct communicating with said casing, of an air filter mounted in said casing to form a passageway communicating with said duct, said air filter comprising a lower upwardly extending portion mounted on the floor in spaced relation to the casing and terminating in an upper outwardly extending portion engaging said casing above said air duct, and means closing the ends of said passage-way whereby the air from said duct passes through said passage-way and filter in entering said casing.

8. The combination with a hot air furnace having a floor, a casing, an air duct communicating with said casing, of an air filter mounted in said casing, said filter comprising a lower upwardly extending portion mounted on said floor in spaced relation to said casing and terminating in an upper outwardly extending portion engaging said casing above said duct, plates carried by the ends of said filter and extending perpendicularly thereto into engagement with said floor and casing, and means carried by the upper and lower edges of said filter to support and position said filter in said casing.

9. The combination with a hot air furnace having a floor, a casing, an air duct communicating with said casing, of an air filter formed in a plurality of sections, said filter being mounted on the floor of the furnace in spaced relation to the furnace casing and engaging the casing above said air duct to provide a passage-way communicating with said duct, means securing said filter sections together in end-contacting relation, and means closing the ends of said passage-way.

10. The combination with a hot air furnace having a floor, a casing, an air duct communicating with said casing, of an air filter formed in a plurality of sections, each of said sections comprising a lower upwardly extending portion mounted on the floor in spaced relation to the casing and terminating in an outwardly extending upper section engaging said casing, reinforcing means secured to the peripheral edges of each section of said filter, means for securing said filter sections together, and a plate carried by each end section at the outer end thereof and extending therefrom into engagement with said floor and casing.

11. The combination with a furnace having a combustion chamber and a spaced casing, an air duct communicating with said casing, of a filter forming an elongated passage-way in said casing communicating with said air duct, whereby air entering said passage-way from said duct and passing therethrough is distributed in a wide area between the combustion chamber and furnace casing.

12. The combination with a furnace having a combustion chamber and a spaced casing, an air duct communicating with said casing, of a filter member disposed in said casing to form a passage-way extending substantially thereabout and communicating with said air duct, said filter being arranged to diffuse the air from said air duct throughout the casing.

In testimony whereof I affix my signature.
MERLE P. DURREN.